United States

Gazard et al.

[11] 3,719,780
[45] March 6, 1973

[54] RECORDING AND DISPLAY LASER SCANNING SYSTEM USING PHOTOCHROMIC SUBSTRATES

[75] Inventors: Maryse Gazard; Lucien Barbet, both of Paris, France

[73] Assignee: Thomson-CSF, Paris, France

[22] Filed: March 17, 1971

[21] Appl. No.: 125,287

[30] Foreign Application Priority Data

March 17, 1970 France..............................7009517

[52] U.S. Cl........178/7.6, 178/DIG. 28, 178/DIG. 31
[51] Int. Cl..............................................H04n 3/08
[58] Field of Search.........178/7.6, DIG. 27, DIG. 28, 178/DIG. 31

[56] References Cited

UNITED STATES PATENTS 3,483,511   12/1969   Rabinow ...............................178/7.6
2,163,537   6/1939    Clothier et al.................178/DIG. 27
3,569,616   3/1971    Baker....................................178/7.6

*Primary Examiner*—Robert L. Griffin
*Assistant Examiner*—George G. Stellar
*Attorney*—Cushman, Darby & Cushman

[57] ABSTRACT

A system is provided for producing high-linearly optical field scanning, which can be synchronized by external electrical systems and enables ready exploitation of photochromic substrates to be effected.

It comprises a laser, a light modulator, a line-scan deflector with a galvanometer mirror, a frame-scan deflector with a flat mirror associated with a disengageable constant speed drive and a device for returning the mirror to the original position, an optical focusing lens, and a circuit producing the video signal SV which is to be displayed, and the line-scan and frame-scan signals SL and SI respectively.

4 Claims, 6 Drawing Figures

RECORDING AND DISPLAY LASER SCANNING SYSTEM USING PHOTOCHROMIC SUBSTRATES

The present invention relates to improvements in recording and display systems, in particular those utilizing photochromic substrates.

Photochromic substances, such as spiropyranes, anils, silver halide glasses etc., change color in a reversible manner, under the action of electromagnetic radiation, of a predetermined wavelength changing in fact from a colorless condition to a colored condition. Certain substances may take on color under the action of electromagnetic radiation of a wavelength in the order of 4,800 A. such as emitted by an argon laser. Where photochromic substances are concerned, the return from the colored condition to the colorless condition may be brought about either by heating or may take place spontaneously a certain number of minutes after irradiation.

Consequently, systems of recording on photochromic wires frequently employ a laser as the light source, this making it possible, too, to readily produce a fine, high-intensity light beam. An optical modulator device is added in order to amplitude-modulate the light beam in accordance with the video signal to be translated.

It is a point of interest where display applications are concerned, to be able to record upon a transparent photosensitive substrate, any video image. The image is obtained in a manner similar to that used in cathode-ray tubes, the line-scan function being applied to the light beam in order to write in the image. The two optical scanning functions, namely line-scan and frame-scan, which are required, should, in much the same way, be synchronized with the video signal.

The invention relates more particularly to an optical deflector unit which is employed in a display system using a photochromic substrate.

The known kinds of optical devices for producing two-dimensional deflection of the light beam, are numerous and varied. They present various drawbacks which prevent them from being effectively used in order, in particular, to write-in a video image upon a photochromic substrate.

Where the majority of these devices are concerned, the deflection angles are small and the absorption substantial. Certain ones of them utilize a facetted mirror and are difficult to synchronize, whilst others employ optical fibers which absorb a substantial amount of light and produce aberrations in the image.

A system in accordance with the invention overcomes the drawbacks and defects presented by said devices, thanks to its use of two-dimensional deflection means which are synchronizable by external line and frame signals and produce high-linearity scanning. Moreover, the deflection angles obtained are substantial ; the flat mirrors utilized only introduce very small light losses ; the assembly can be designed to have small size and makes it possible to use a medium power laser source, for example one producing about 100 mW.

According to the invention there is provided a system for deflecting a light beam, in two directions perpendicular to each other, according a predetermined time law comprising in combination : a first mirror, for reflecting said beam and for generating a first reflected beam, a first rotation axis carrying said first mirror, galvanometer means for controlling the rotation of said axis, having an input for receiving a first scanning signal ; a second mirror for receiving said first reflected beam, having a second rotation axis perpendicular to said first axis ; motor means for rotating said mirror for one predetermined position to an another, and spring means to return said second mirror to said one predetermined position, and a second scanning electrical signal for controlling said motor means.

Other features of the present invention will become apparent during the course of the ensuing description given by way of non-limitative example and referring to the attached Figures in which.

Figure 1:
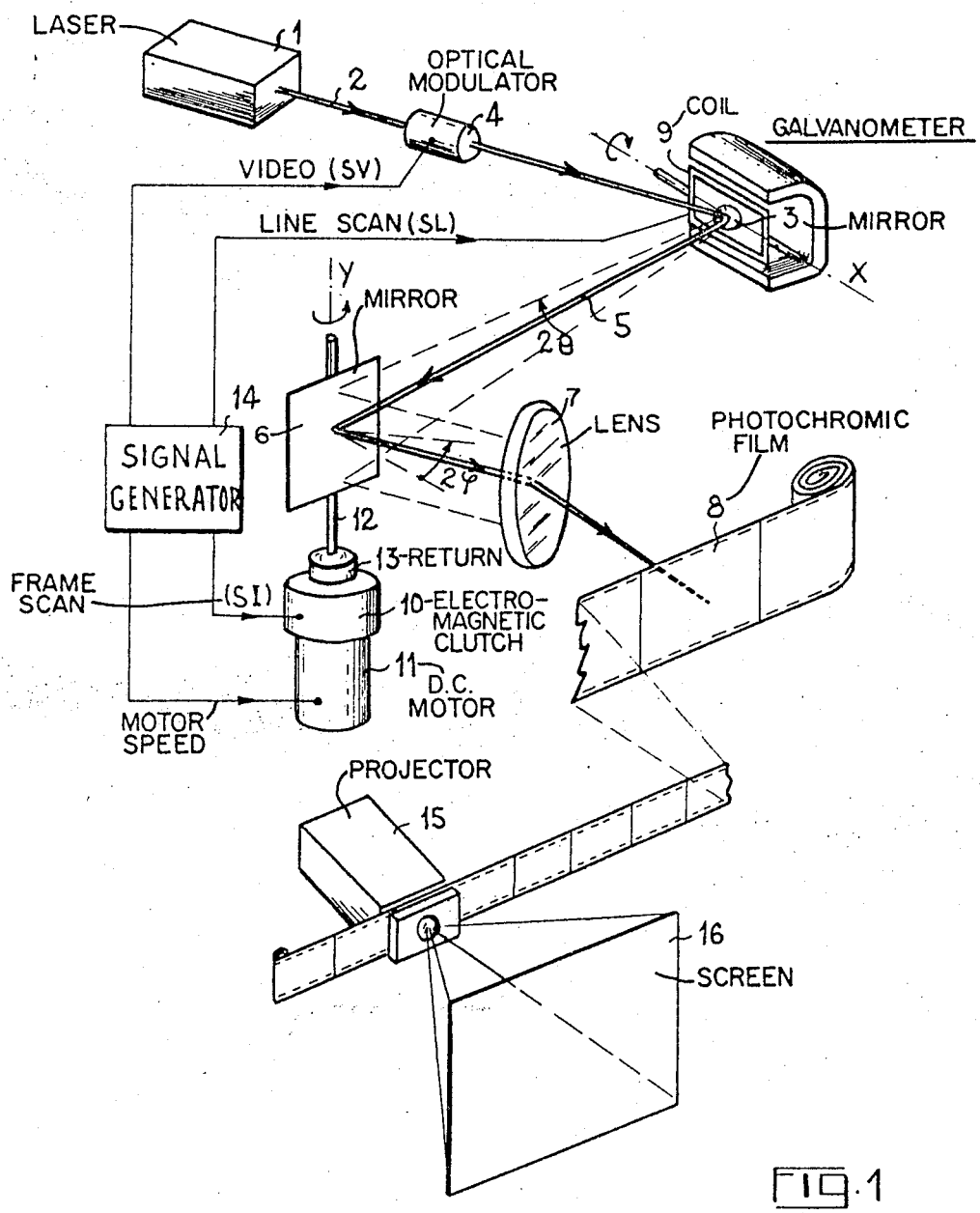
FIG. 1 is a diagram of a display system in accordance with the invention.

A recording and display system in accordance with the invention is shown in the diagram of FIG. 1. The video image is recorded upon a photosensitive film 8 for display purposes. This latter is advantageously carried out on a large scale by projection upon a screen 16. The utilization of a transparent photochromic film instead of a photographic film is preferred in certain applications since a photochromic film requires no development, has better resolution than photographic films, can be used for projection directly after exposure or recording, and can be re-used after several minutes have passed. By way of example, the video signal SV can correspond to the moving image appearing upon a radar screen during one antenna rotation. The use of photochromic substances has the advantage that the image is stored for a longer time than is possible with the corresponding electronic tubes. For this kind of application, the frame-scan function should be synchronized with the rotation of the antenna and the line-scan function with the radar pulse frequency.

Figure 2:
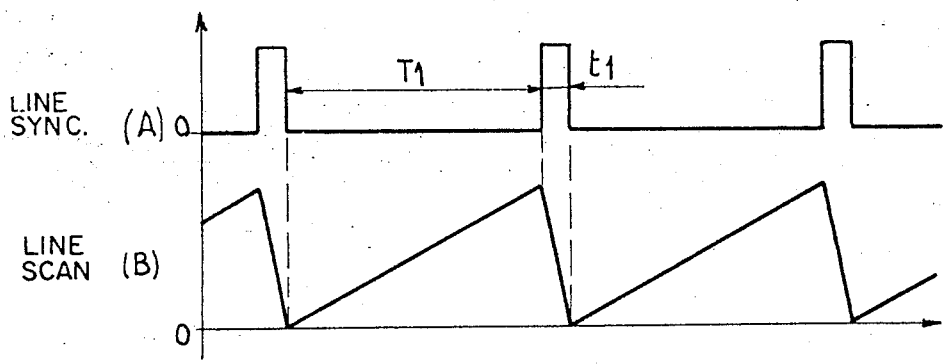
FIGS. 2 and 3 are waveforms of the line-scan and frame-scan deflection signals.
Figure 3:
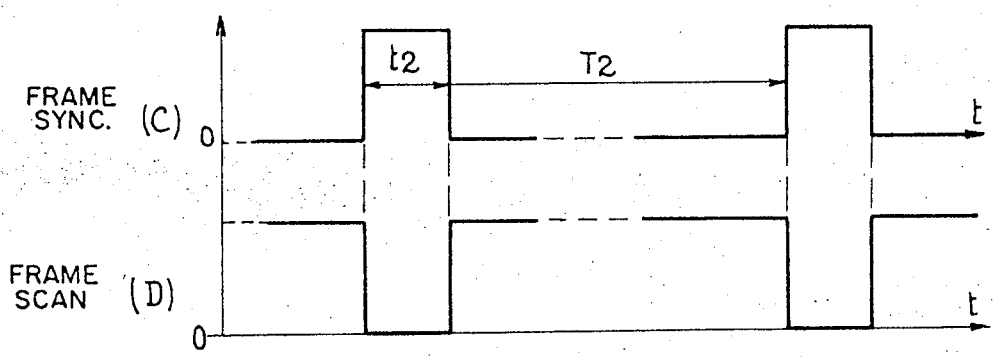

A light source 1, such as a laser, produces a highly focused high-intensity light beam 2. The flat mirror 3 of a galvanometer, acts as a first deflection element. A light modulator 4 created by conventional techniques, for example a Pockels-effect electro-optical modulator, is arranged in the incident optical trajectory. The reflected beam 5 is received by a flat reflector mirror 6 constituting the second deflector element. After the second deflection, the beam is transmitted through a lens 7 which focuses it onto the plane of the film 8 located behind it. The mirrors 3 and 6 are controlled by external electrical signals which cause them to rotate about their axes, the latter being at right-angles to one another. The mirror 3 produces the optical line-scan function and the mirror 6 the linear displacement at right angle to the foregoing, namely the frame-scan functions. The line-scan signals SL and frame-scan signals SI corresponding to these, are produced from line sync. and frame sync. signals which are created in correlation with the video signal SV. FIG. 2 illustrates at (A) a line sync. signal and at (B) a line-scan signal SI wich is a sawtooth voltage. The rise time T1 corresponds to the line-scan and the time $t_1$ to the flyback period. The signal SL supplies the coil 9 of the galvanometer which uniformly rotates the mirror 3 about the axis X through a total angular sweep having a predetermined value θ. FIG. 3 likewise indicates at (C) a frame sync. signal and at (D) a frame-scan signal SI ; T2 is the frame-scan time and $t_2$ the frame flyback time. The number of lines can amount to several hundred per frame, as in the case of a television frame. The signal SI is applied to an electromagnetic clutch 10, preferably one of the fixed coil type. Part of the clutch is fixed to an element 11 producing a uniform rotation drive and constituted, for example, by a regulated d.c. motor coupled to a reduction gear. Regulation can be effected in the conventional way by using a tachogenerator connected at the end of the shaft, the voltage from which is applied as negative feedback to the supply circuit. The other part of the clutch 10 is fixed to a spindle 12 extending in the Y-direction and carrying the mirror 6. The application of the rectangular waveform pulse SI of duration T2, causes the two sections of the clutch to engage and the motor uniformly rotates the mirror 6 around the axis Y. The speed of the motor is regulated so that the mirror rotates through a given angle φ during the time $T_2$. As soon as the frame scan has finished, the clutch is disengaged and a return device 13 causes the mirror 6 to flyback to the original position. The device 13 can comprise a spring and a mechanical stop. At a time $t_2$ after the end of the frame, the cycle can recommence for the next frame. A device which is not shown, drives and stops the film 8 during the time $tt_2$. As soon as an image recorded on the photochromic film arrives opposite the lens of a projector 15 associated therewith, it can be projected in enlarged fashion upon a screen 16 located some distance away. The unit 14 symbolizes the set of circuits wich produce the video signal SV and the scanning signals SL, SI corresponding thereto, as well as controlling the drive arrangement 11.

Figure 4:
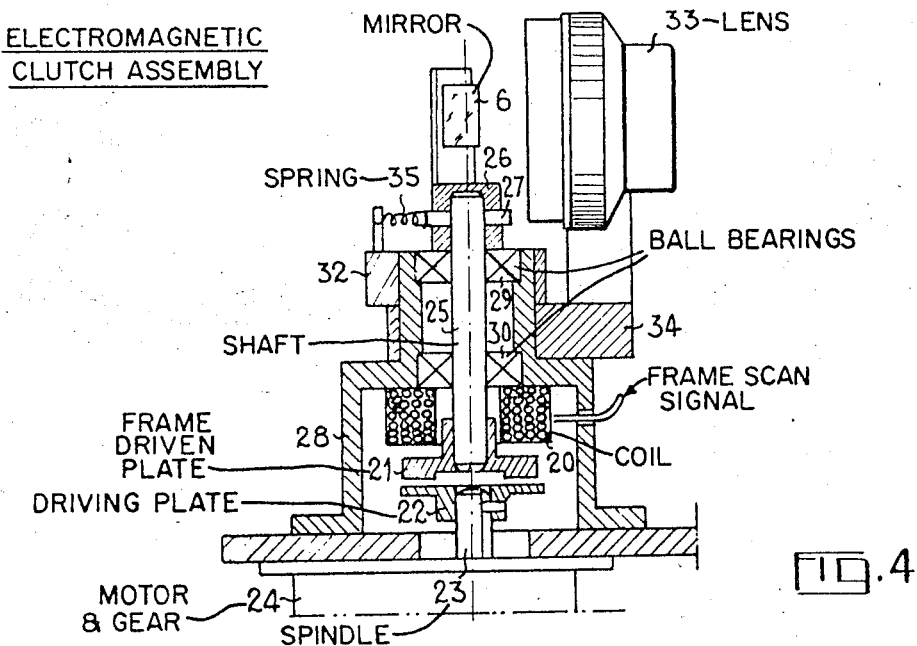
FIGS. 4 and 5 are two detailed views of two-dimensional optical deflection system.
Figure 5:
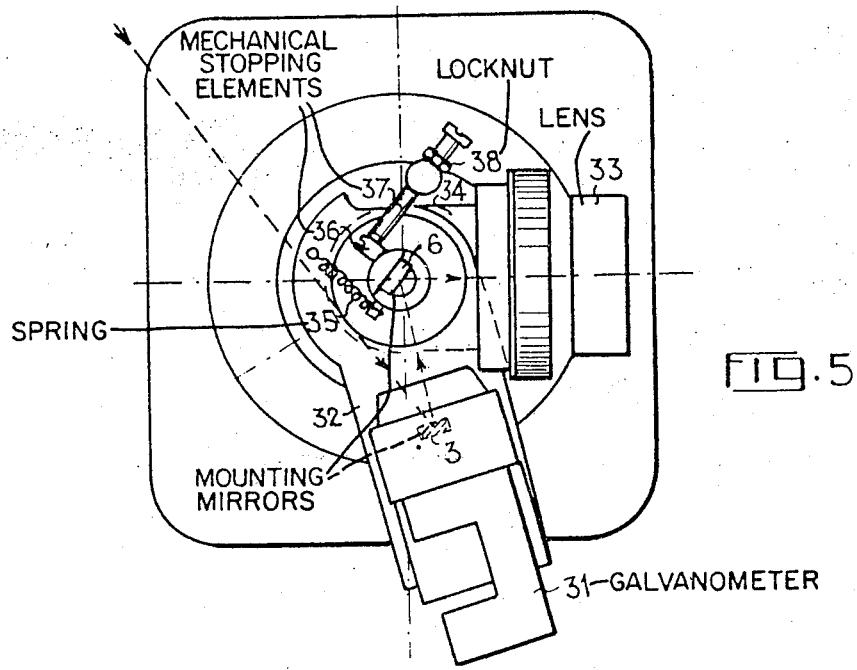

FIGS. 4 and 5 relate to an embodiment of an optional frame deflection system in accordance with the invention. The sectional view (FIG. 4), illustrates the electromagnetic clutch, showing a fixed coil 20 supplied with the scanning signal SI, a driven plate 21 and a driving plate 22. The latter is displaced in a translational fashion along the spindle 23, when the clutch is energized and engages the plates 21 to which it transmits the uniform rational motion produced by the motor and gear arrangement 24. This movement in turn rotates the shaft 25 and the mirror 6 attached thereto by the pieces 26–27. The connections to the frame 28 are effected by means of ball-bearing 29–30.

The plan view (FIG. 5), illustrates how the mirror 6 is optically connected with the mirror 3 of a galvanometer 31 wich is secured or mounting 32 (the locking means are not shown), and with a focusing lens 33 assembled upon another support 34. The return means for the mirror 6, i.e. the means for returning it to the frame reference position, comprise a spring 25 and mechanical stopping elements 36 and 37. The stop can be adjusted in position by rotating the screw 37 after having off the locknut 38.

The use of a galvanometer mirror makes it possible to achieve rapid line-scan deflection through a large angle. The device described hereinbefore by way of example, has been used to record 600 lines in 10 secs with scan angles in the line deflection sense of $74 = 20°$ and in the frame deflection sense of $2\phi =+°$, the frame flyback time being less than 20 ms.

Figure 6:
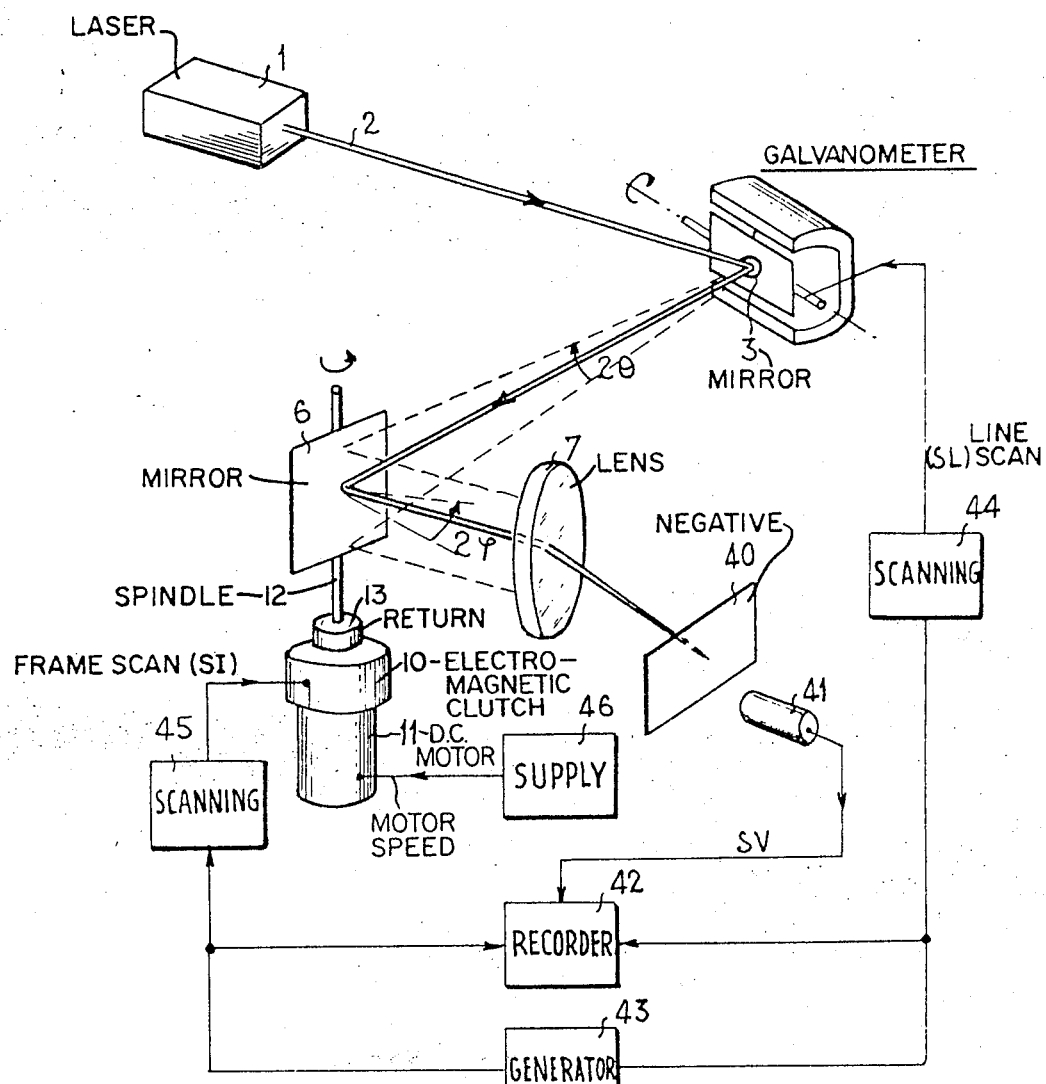
FIG. 6 is a diagram of a system in accordance with the invention applied to a magnetic tape recording arrangement.

The deflection system described can be used to record in a memory, in particular in a magnetic tape, a negative which is to be reproduced, as indicated in FIG. 6. The unmodulated beam 2 from the source 1, scans the transparent negative 40 line by line. Behind the negative, there is a photo-detector assembly comprising a photosensitive element 41 such as a photoelectric cell, and this transmits the corresponding video signal SV to a tape-recorder 42. The line and frame sync. signals are produced by a generator 43 and simultaneously applied to the circuits 44–45 generating the scanning voltages SL, SI, and to the stereo-recorder 42. The unit 46 represents a regulated supply for the drive arrangement 11. The magnetic tape can be processed subsequently in order to expose or sensitize a photochromic film in accordance with the arrangement of FIG. 1, and produce a projected display.

A recording and display system in accordance with the invention makes for easy exploitation of photochromic substates, thus enabling the advantages offered by these latter to be benefitted from.

The foregoing description has been given purely by way of nonlimitative example and the invention in fact covers all variant embodiments which conform with the aforedescribed characteristics.

What we claim is:

1. A laser two dimensional scanner system comprising a loser for producing a light beam a first mirror for reflecting said light beam to generate a first reflected light beam along a first scan direction having a first rotation shaft for carrying said first mirror, galvanometer means for controlling the rotation of said first shaft under control of a first scanning signal a second mirror for reflecting said first reflected light beam to generate a second reflected light beam having a second rotation shaft having an axis perpendicular to the axis of said first shaft for carrying said second mirror a motor and means for giving said motor a constant angular velocity an electromagnetic clutch mechanically coupled intermediate said motor and said second rotation shaft under control of a second scanning signal for engaging 1 disengaging said second rotation shaft and said motor means for limiting the angular rotation of said second rotation shaft to less than 360°and spring means for returning said second mirror to a predetermined position when said clutch is disengaged.

2. A system as claimed in claim 1, wherein said first signal is a line scanning signal, said second signal is a frame scanning signal.

3. A system as claimed in claim 1, wherein a negative is scanned by said second reflected beam photoelectric means, being provided for receiving said second reflected beam after passage through said negative.

4. A system as claimed in claim 1, further comprising a photochromic film is scanned by said second reflected beam, an electro-optical modulator for modulating the amplitude of said light beam with a video signal.

* * * * *